(12) United States Patent
Catalano et al.

(10) Patent No.: US 10,460,032 B2
(45) Date of Patent: Oct. 29, 2019

(54) COGNITIVE LEXICON LEARNING AND PREDICTIVE TEXT REPLACEMENT

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy O. Tsfasman, Wappingers Falls, NY (US); John S. Werner, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/461,511

(22) Filed: Mar. 17, 2017

(65) Prior Publication Data

US 2018/0267954 A1    Sep. 20, 2018

(51) Int. Cl.
| | |
|---|---|
| G06F 17/27 | (2006.01) |
| G10L 21/00 | (2013.01) |
| G10L 15/00 | (2013.01) |
| H04L 12/58 | (2006.01) |
| H04W 4/14 | (2009.01) |

(52) U.S. Cl.
CPC ........ *G06F 17/277* (2013.01); *G06F 17/2735* (2013.01); *G06F 17/2795* (2013.01); *H04L 51/32* (2013.01); *H04W 4/14* (2013.01)

(58) Field of Classification Search
CPC .......... G06F 17/27; G10L 21/00; G10L 15/00
USPC ..................................... 704/9, 235, 257, 270
See application file for complete search history.

(56) References Cited

U.S. PATENT DOCUMENTS

| | | | | |
|---|---|---|---|---|
| 8,374,871 | B2* | 2/2013 | Ehsani ............... | G10L 15/193 704/257 |
| 8,744,855 | B1* | 6/2014 | Rausch .............. | G06F 17/27 235/375 |
| 8,888,493 | B2* | 11/2014 | Sheehan ............ | G09B 17/003 434/169 |
| 9,286,287 | B1* | 3/2016 | Tierney ............. | G06F 17/2735 |
| 9,304,989 | B2* | 4/2016 | Spivack ............. | G06F 17/275 |

(Continued)

OTHER PUBLICATIONS

Appendix P List of IBM Patents or Applications Treated as Related dated Feb. 19, 2018. Two pages.

(Continued)

*Primary Examiner* — Seong-Ah A Shin
(74) *Attorney, Agent, or Firm* — Stephen R. Yoder

(57) ABSTRACT

A method comprising of receiving a first communication content directed to a user. The first communication content includes one or a combination of the following: content read by the user and content written by the user. The method also comprises of generating tokens corresponding to the first communication content by applying natural language processing and generating a token frequency index for the user, based on the tokens generated from the first communication content. The method determines a lexicon reading level for the user, based on the token frequency index generated for the user. The lexicon reading level indicates a reading level of the user. The method adds the lexicon reading level to a lexicon profile of the user. The method modifies a second communication content by replacing tokens with synonyms of the tokens based on comparing the difficulty ratings of the tokens with the user's lexicon reading level.

6 Claims, 4 Drawing Sheets

(56) References Cited

U.S. PATENT DOCUMENTS

| | | | | |
|---|---|---|---|---|
| 9,336,204 | B1* | 5/2016 | Amundsen | G06F 17/28 |
| 9,652,993 | B2* | 5/2017 | Dodelson | G09B 7/00 |
| 2002/0032564 | A1* | 3/2002 | Ehsani | G06F 17/2775 |
| | | | | 704/235 |
| 2002/0199166 | A1* | 12/2002 | Volcani | G06F 17/2795 |
| | | | | 717/100 |
| 2003/0068603 | A1* | 4/2003 | Cupp | G09B 17/00 |
| | | | | 434/178 |
| 2004/0024569 | A1* | 2/2004 | Camillo | G06Q 30/06 |
| | | | | 702/182 |
| 2006/0115800 | A1* | 6/2006 | Daley | G09B 21/006 |
| | | | | 434/185 |
| 2007/0067294 | A1* | 3/2007 | Ward | G06F 16/9535 |
| 2007/0292826 | A1* | 12/2007 | Goddy | G09B 19/00 |
| | | | | 434/156 |
| 2009/0197225 | A1* | 8/2009 | Sheehan | G09B 17/00 |
| | | | | 434/169 |
| 2009/0246744 | A1* | 10/2009 | Lofthus | G09B 5/02 |
| | | | | 434/169 |
| 2012/0024595 | A1 | 2/2012 | Even et al. | |
| 2012/0245925 | A1* | 9/2012 | Guha | G06F 17/27 |
| | | | | 704/9 |
| 2013/0158897 | A1 | 6/2013 | Jain | |
| 2013/0158978 | A1* | 6/2013 | Banke | G06F 17/27 |
| | | | | 704/9 |
| 2013/0323693 | A1* | 12/2013 | Gandhe | G09B 17/00 |
| | | | | 434/178 |
| 2014/0108006 | A1* | 4/2014 | Vogel | G06F 17/28 |
| | | | | 704/9 |
| 2014/0122990 | A1* | 5/2014 | Puppin | G06F 17/218 |
| | | | | 715/229 |
| 2014/0234810 | A1* | 8/2014 | Flor | G09B 7/02 |
| | | | | 434/169 |
| 2015/0309986 | A1* | 10/2015 | Brav | G06F 16/35 |
| | | | | 707/739 |
| 2015/0310002 | A1* | 10/2015 | Yu | G06F 17/241 |
| | | | | 707/750 |
| 2015/0310571 | A1* | 10/2015 | Brav | G06F 17/277 |
| | | | | 705/311 |
| 2016/0246776 | A1* | 8/2016 | Zhao | G06F 17/278 |
| 2017/0069215 | A1* | 3/2017 | Borofsky | G09B 7/04 |
| 2019/0050391 | A1* | 2/2019 | Knox | G06F 17/276 |

OTHER PUBLICATIONS

Catalano et al. Original U.S. Appl. No. 15/718,829, filed Sep. 28, 2017.

Weinman, et al., "Scene Text Recognition Using Similarity and a Lexicon with Sparse Belief Propagation", IEEE Transactions on Pattern Analysis and Machine Intelligence, vol. 31, No. 10, Oct. 2009, pp. 1733-1746.

Internet Archive WaybackMachine"The Lexile® Framework for Reading", Lexile, Aug. 25, 2016. © 2016 MetaMetrics, 3 pages, <https://lexile.com/>.

* cited by examiner

COGNITIVE LEXICON LEARNING AND PREDICTIVE TEXT REPLACEMENT

BACKGROUND OF THE INVENTION

The present invention relates to the field of natural language processing, and more specifically, text replacement utilizing tokenization from natural language processing.

Communication content consists of text, audio and even transformation of images to text by object recognition, expressed in a computer-readable format. This content is user-generated and consists of both professional and personal written works. Examples of communication content include websites, books, publications, and social media posts. Some communication content, such as social media posts, often contain metadata about the content to help provide not only content, but context. Metadata often includes information about location, engagement, and links shared. Communication content provides some insight on the content creator, as content parsed from the communication content can be utilized by a number of applications. For example, social media posts may be parsed to help identify appropriate targeted advertising.

Natural language processing is a field concerned with the interactions between computers and human (natural) languages. Tokenization is the process of utilizing natural language processing to break-up a stream of text into words, phrases, symbols, or other meaningful elements called tokens. Tokenization typically occurs at the word level and takes into consideration punctuation, spaces, contractions, hyphens, and emoticons. Tokens generated from content may become input for further processing.

Matching readers with appropriate books based on reader level is done in elementary schools and through online applications. Users can receive a reading level score based on reading comprehension tests. Software that examines a document's reading demand or difficulty level are also available to use by students and teachers.

SUMMARY

Embodiments of the present invention disclose a method, a computer program product, and a system for adjusting content to align with a lexicon reading level of a user. The method comprises of receiving a first communication content directed to a user. The first communication content includes one or a combination of the following: content read by the user and content written by the user. The method also comprises of generating tokens corresponding to the first communication content by applying natural language processing and generating a token frequency index for the user, based on the tokens generated from the first communication content. The method determines a lexicon reading level for the user, based on the token frequency index generated for the user. The lexicon reading level indicates a reading level of the user. The method adds the lexicon reading level to a lexicon profile of the user. The method modifies a second communication content by replacing tokens with synonyms of the tokens based on comparing the difficulty ratings of the tokens with the user's lexicon reading level.

DETAILED DESCRIPTION

Embodiments of the present invention recognize that particular words contained in documents read by people are often not understood. This is because the words are too technical or foreign to the reader. Often, readers naturally understand meanings of words foreign to them by using the context of the words in the document. However, this does not occur all the time. Because of this, readers are left not fully understanding parts of the document they are reading. Readers are able to simply skip words, which risks incorrect understanding of the content, or are able to look up words in a dictionary but this may be time-consuming or cumbersome.

Embodiments of the present invention provide a method to determine a user's lexicon based on communication content sources, such as websites, books, publications, and social media posts, and predictively replace content in communication content that is determined to be above the consumer's reading level with a synonym, or a definitional phrase of the word in question that is within the user's reading level. The difficulty level of the communication content can be adjusted to a reader's level using a learned lexicon of the particular user.

Figure 1:
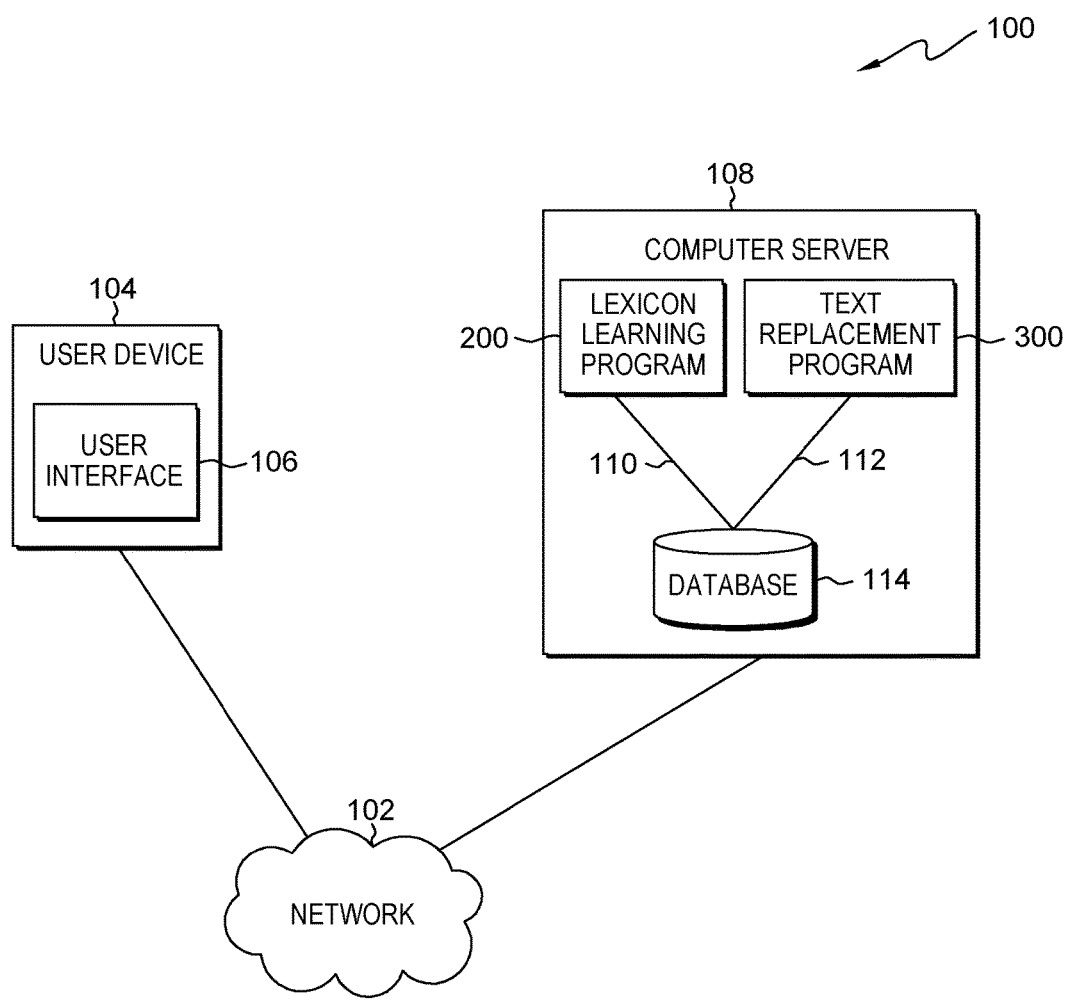
FIG. 1 is a functional block diagram illustrating a distributed data processing environment, in accordance with one embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes user device 104, which further includes user interface 106; computer server 108, which further includes lexicon learning program 200, text replacement program 300, and database 114; all of which are interconnected via network 102.

Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between user device 104, computer server 108, and other computing devices (not shown) within distributed data processing environment 100.

User device 104 allows users access to user interface 106, which in turn allows users access to lexicon learning program 200 and text replacement program 300. User device 104 can be a can be a laptop computer, a tablet computer, a netbook computer, a personal computer (PC), a desktop computer, a personal digital assistant (PDA), a smart phone, or any other programmable electronic device capable of communicating with various components and devices within distributed data processing environment 100, via network 102. In general, user device 104 represent any programmable electronic mobile device or combination of programmable electronic mobile devices capable of executing machine readable program instructions and communicating with other computing devices (not shown) within distributed data processing environment 100 via a network, such as network 102. User device 104 includes user interface 106. In some embodiments of the present invention, user device 104 may include internal and external hardware components, as depicted and described in further detail with respect to FIG. 4.

User interface 106 provides an interface to lexicon learning program 200 and text replacement program 300 on computer server 108 for a user of user device 104. In one embodiment of the present invention, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of user device 104 and computer server 108. Application software, or an "app," is a computer program designed to run on computing devices, smart phones, tablet computers and other mobile devices. User interface 106 enables the user of user device 104 to create a user lexicon profile on lexicon learning program 200, which determines a lexicon reading level for the user. User interface 106 may also enable the user of user device 104 to input communication content to text replacement program 300.

Computer server 108 can be a standalone computing device, a management server, a web server, a mobile computing device, or any other electronic device or computing system capable of receiving, sending; and processing data. In other embodiments, computer server 108 can represent a server computing system utilizing multiple computers as a server system, such as in a cloud computing environment. In another embodiment, computer server 108 can be a laptop computer, a tablet computer, a netbook computer, a personal computer (PC), a desktop computer, a personal digital assistant (PDA), a smart phone, or any other programmable electronic device capable of communicating with user device 104 and other computing devices (not shown) within distributed data processing environment 100 via network 102. In another embodiment, computer server 108 represents a computing system utilizing clustered computers and components (e.g., database server computers, application server computers, etc.) that act as a single pool of seamless resources when accessed within distributed data processing environment 100. Computer server 108 includes lexicon learning program 200, text replacement program 300, and database 114. Lexicon learning program 200 and text replacement program 300 are interconnected with database 114 by communication bus 110 and communication bus 112 respectively. In some embodiments of the present invention, lexicon learning program 200 and text replacement program 300 are communicatively connected to database 114. In other embodiments, lexicon learning program 200, text replacement program 300, and database 114 are accessible to computer server 108 via network 102 (not shown). Computer server 108 may include internal and external hardware components, as depicted and described in further detail with respect to FIG. 4.

Lexicon learning program 200 determines a lexicon reading level of a user, based on communication content users of user interface 106 have read, written and received as input. Other media types, such as video or audio content the user has viewed, listened too, or orated many also be received as inputs. A user of user interface 106 uses lexicon learning program 200 to register and create a unique user lexicon profile. Lexicon learning program 200 receives input of communication content that the user has read and written. Communication content utilized in lexicon learning program 200 are written to computer-readable media. Lexicon learning program 200 uses natural language processing tokenization to tokenize the communication content. Lexicon learning program 200 generates a lexicon frequency index using tokens established from tokenization of communication content. The lexicon frequency index is based on how often particular tokens are used within the communication content sources received as input. In some embodiments of the present invention, lexicon learning program 200 updates the lexicon frequency index based on receipt of new communication content. Lexicon learning program 200 determines a lexicon reading level for a specific user based on the user's lexicon frequency index. Lexicon learning program 200 is depicted and described in further detail with respect to FIG. 2.

Text replacement program 300 replaces tokens in communication content,inch is determined to have a higher difficulty rating than a user's lexicon reading level, with tokens that have a difficulty rating within the user's lexicon reading level. The text replacement program 300 may also replace tokens that are at the user's lexicon reading level, or lower, but do not appear in the user's lexicon frequency index. Text replacement program 300 receives unconsumed communication content for natural language processing by a user of user interface 106. Text replacement program 300 uses natural language processing to tokenize the entirety of the communication content. Text replacement program 300 determines a difficulty rating of a token, and determines if the token difficulty rating is greater than the user's lexicon reading level the token's difficulty rating is greater than the user's lexicon reading level, then text replacement program 300 replaces the token with a lower difficulty rated like-meaning synonym token similar to the user's lexicon reading level. If the token's difficulty rating is less than or equal to the user's lexicon reading level, then text replacement program 300 leaves the token unchanged. Text replacement program 300 replaces the higher difficulty token within the communication content with a lower difficulty token if necessary. Text replacement program 300 determines if there are additional tokens in the communication content that have yet to be analyzed. If there are additional tokens in the communication content that have not been analyzed, text replacement program 300 proceeds to the next token to identify, determine difficulty rating, and replace, if appropriate. If there are no additional tokens in the communication content that need to be analyzed, text replacement program 300 outputs the communication content updated with replaced tokens. Text replacement program 300 is depicted and described in further detail with respect to FIG. 3.

Database 114 is a repository for data used by lexicon learning program 200 and text replacement program 300. In the depicted embodiment, database 114 resides on computer server 108. In another embodiment of the present invention, database 114 may reside elsewhere within distributed data processing environment 100 provided lexicon learning program 200 and text replacement program 300 have access to database 114, for example, via network 102. A database is an organized collection of data and the data relative to embodiments of the present invention that are included in database 114 are associated with functions of lexicon learning program 200 and text replacement program 300. Database 114 stores communication content associated with user's lexicon profile and lexicon reading level data associated with users of user interface 106. Database 114 may also store metadata regarding communication content sources and a lexicon frequency index to lexicon reading level algorithms. For example, a user of lexicon learning program 200 creates a lexicon profile and links several communication content sources. A document is uploaded for text replacement. The user uploads a document for text replacement. Database 114 would store the lexicon profile and the lexicon reading level outputted from lexicon learning program 200 as well as the communication content sources received as input by the user. The user would not have to re-upload communication content sources for future text replacement needs, however, the user may add additional communication content sources or remove previously linked communication content sources through time. Database 114 would also store metadata regarding the communication content sources linked to the user's lexicon profile in order to create the user's lexicon frequency index. Database 114 may also store the outputted document with text replacements for the user to access and may store received documents and text-updated documents of text replacement program 300 for future text replacement needs. Database 114 may also store a dictionary, thesaurus, and word difficulty indexes that can be referenced by lexicon learning program 200 and text replacement program 300. Information on database 114 may be transferred or stored over network 102. Database 114 can be implemented with various types of storage devices capable of storing data and configuration files accessed and utilized by computer server 108, such as a database server, a hard disk drive, or a flash memory.

Figure 2:
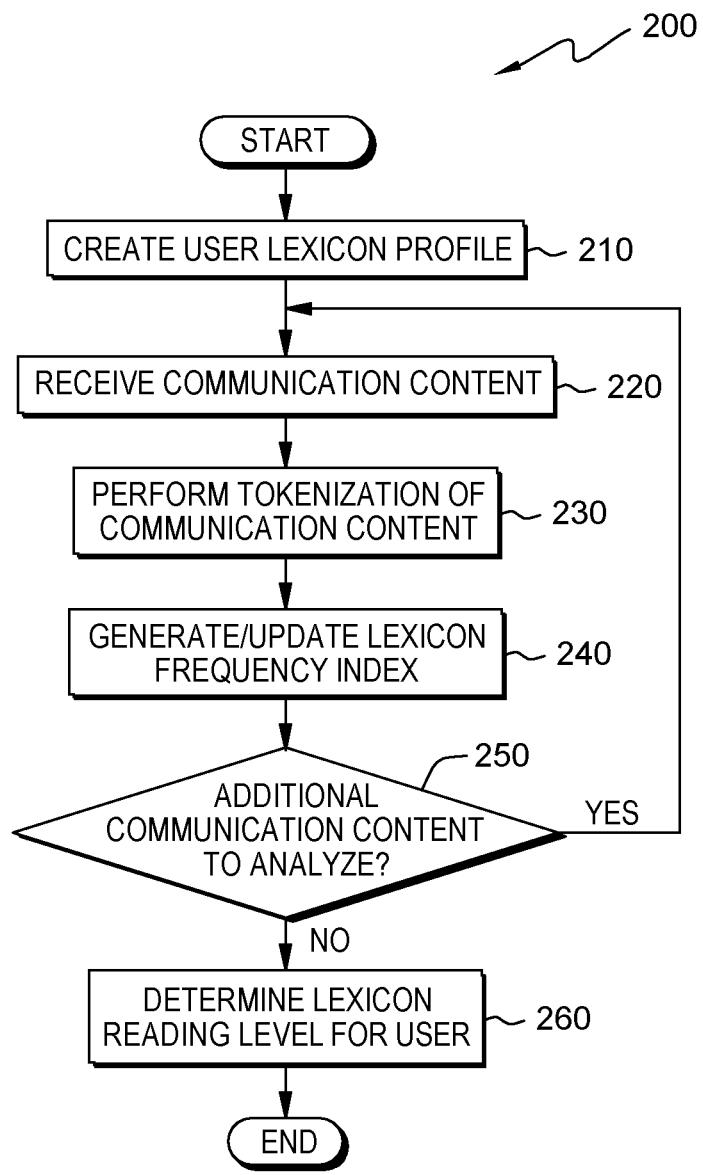
FIG. 2 illustrates operational steps of a lexicon learning program, on a computer server, within the distributed data processing environment of FIG. 1, in accordance with an embodiment of the present invention.

FIG. 2 illustrates operational steps of lexicon learning program 200, on computer server 108, within distributed data processing environment 100 of FIG. 1, for generating a lexicon reading level based on communication content users have received as input, in accordance with an embodiment of the present invention.

Lexicon learning program 200 creates a lexicon profile (step 210). In an embodiment of the present invention, a user registers a lexicon profile with lexicon learning program 200 and links communication content sources. A user accesses user device 104 of FIG. 1 via user interface 106 of FIG. 1. Lexicon learning program 200 accesses the linked communication content sources. Communication content consists of content expressed in a computer-readable format. Communication content sources include sources users have read or written. Communication content sources read by a user that can be linked to a user's lexicon profile may include websites, books, and online journals. Communication content sources written by a user that can be linked to a user's lexicon profile may include publications, social media posts, emails, SMS text messages, and locally stored documents. Once registered, the lexicon profile may be accessed by the user and the user may link or unlink communication content sources. For example, a user of lexicon learning program 200 creates a lexicon profile with lexicon learning program 200. The user links communication content sources to the lexicon profile. The user links the user's typed text messages, the user's typed emails, the user's social media profiles and the user's authored short story to the user's lexicon profile. Lexicon profiles may be stored on database 114 of FIG. 1.

Lexicon learning program 200 receives communication content from communication content sources (step 220). In an embodiment of the present invention, lexicon learning program 200 accesses and retrieves computer-readable communication content sources to which a user has linked to the user's lexicon profile. For example, a user of lexicon learning program 200 can link the user's lexicon profile to an account on a social cataloging application like "Goodreads" so that lexicon learning program 200 may access books the user has read. ("Goodreads" may be subject to trademark rights in various jurisdictions throughout the world and is used here only in reference to the products or services properly denominated by the marks to the extent that such trademark rights may exist). In another example, a user of lexicon learning program 200 can link the user's lexicon profile to a personal Twitter® account so that lexicon learning program 200 may access social media posts the user has written or read (Twitter is a registered trademark of Twitter Inc. In the U.S., and other countries worldwide). In another embodiment, lexicon learning program 200 accesses audio communication content linked to a lexicon profile. Lexicon learning program 200 utilizes speech-to-text recognition software to transform audio communication into a computer-readable format. For example, a user links an audio recording of an oral presentation to the user's lexicon profile. Lexicon learning program 200 utilizes speech-to-text software to transform the audio recording into a computer-readable format in order to utilize it as a communication content input.

Lexicon learning program 200 uses natural language processing tokenization of the entirety of the communication content sources received (step 230). Lexicon learning program 200 receives the series of characters (alpha characters, numeric characters and punctuation marks or emoticons) that make up the content belonging to communication content sources and generates tokens from the content. Tokenization is the process of utilizing natural language processing to break-up a stream of text into words, phrases, symbols, or other meaningful elements. Tokenization takes into consideration punctuation, spaces, contractions, hyphens, and emoticons. For example, the text phrase "Friends, Romans, Countrymen, lend me your ears;" would likely generate the following tokens: "Friends", "Romans", "Countrymen", "lend", "me", "your" and "ears". In an embodiment of the present invention, lexicon learning program 200 accesses lexicons such as a computer readable dictionary, or simply a word list, to determine tokens within communication content sources. In some embodiments, lexicons such as computer readable dictionaries or word lists may be stored in database 114 of FIG. 1.

Lexicon learning program 200 generates a lexicon frequency index for the user based on tokens obtained from communication content sources (step 240). The lexicon frequency index may be generated and updated as more tokens are obtained from communication content sources. The lexicon frequency index is based on how often particular tokens are used within the communication content sources received. The lexicon frequency index identifies tokens that a user reads or writes and keeps track of the frequency of which the tokens appear in the written or read content. For example, the text phrase "That's one small step for man, one giant leap for mankind" would generate tokens for each word of the phrase through natural language processing tokenization as described above. The lexicon frequency index would tabulate the tokens "one" and "for" as being used twice and the tokens "That's", "small", "step", "man", "giant", "leap" and "mankind" as being used once. In an embodiment of the present invention, tokens generated from communication content sources written by a user are weighted higher on the lexicon frequency index than tokens generated from communication content sources read by a user. In another embodiment, tokens generated from communication content sources written by a user are weighted lower on the lexicon frequency index than tokens generated from communication content sources read by a user. In yet another embodiment, tokens generated from communication content sources written by a user and tokens generated from communication content sources read by a user are equally weighted. Correct use of the token, by, the user, may also impact weighting. In an embodiment, an aging algorithm is utilized in generating the lexicon frequency index that determines if tokens have not been used for a period of time to account for a user's current vocabulary. If a token has not been used for a period of time, the token is removed from the user's lexicon frequency index. In another embodiment, lexicon program 200 ignores pronouns, articles, and conjunctions, and does not include them in the lexicon frequency index to not overpopulate the lexicon frequency index with commonly used words such as "the" and "a". Referencing the above example, lexicon program 200 would ignore the tokens "That's" and "for" as they are an article and a conjunction respectively.

Having built the lexicon frequency index for the user, lexicon learning program 200 determines whether there is additional communication content -to analyze (decision step 250). If additional communication content sources are received, lexicon learning program 200 updates the lexicon frequency index. Additional communication content sources results in additional tokens being generated, which may be added to the lexicon frequency index. For the case in which lexicon learning program 200 recognizes additional communication content sources were linked to the user's lexicon profile (step 250, "YES" branch), lexicon learning program 200 returns to step 220 to receive additional communication content sources and proceeds as described above. In this case, lexicon learning program 200 receives the additional communication content source and proceeds to utilize tokenization to update the lexicon frequency index for the specific user.

In the case in which lexicon learning program 200 does not recognize additional communication content sources were linked to the user's lexicon profile, lexicon learning program 200 does not receive additional communication content (step 250, "NO" branch"). In this case, lexicon learning program 200 may determine that received input is disregarded with respect to updating the lexicon frequency index, based on content volume, source, or other attributes of the input. In such cases, and subsequent to updating the lexicon frequency index, lexicon learning program 200 proceeds to determine a lexicon reading level for the user (step 260). A lexicon reading level is determined based on a particular user's lexicon profile. In sonic embodiments of the present invention, the lexicon reading level is a number that signifies the reading proficiency of the user. The higher the lexicon reading level number, the more proficient the user is at reading and vocabulary. For example, a user reading at a $12^{th}$ grade reading level will likely have a higher lexicon reading level than a user reading at a $6^{th}$ grade reading level. In other embodiments, other indicators of lexicon reading level may be used, for example, letters, symbols, or descriptive words.

The lexicon reading level is calculated based on the lexicon frequency index and is determined by detecting patterns of sentence structures, vocabulary, and frequency of use from the communication content sources via machine learning and pattern recognition techniques, as would be appreciated by one with skill in the art. The lexicon reading level of a user implies the same reading level in user written communications. Machine learning explores the study and construction of algorithms that can learn from and make predictions based on data. Such algorithms operate by building a model from example inputs in order to make data-driven predictions or decisions expressed as outputs, rather than following strictly static program instructions. Within the field of data analytics, machine learning is a method used to devise complex models and algorithms that lend themselves to decisions, and probability related prediction. These analytical models enable researchers, data scientists, engineers, and analysts to produce reliable, repeatable decisions and results and to uncover hidden insights through learning from historical relationships and trends in the data. Pattern recognition is a branch of machine learning that focuses on the recognition of patterns and regularities in data. Pattern recognition systems may be trained from labeled "training" data (supervised learning), but when no labeled data are available, other algorithms can be used to discover previously unknown patterns (unsupervised learning). Lexicon learning program 200 utilizes the lexicon frequency indexes of individuals to determine comparable lexicon reading levels. As additional users utilize lexicon learning program 200, lexicon learning program 200 analyzes generated lexicon frequency indexes to determine patterns of context and frequency of tokens by comparing with other user's lexicon frequency indexes. Lexicon learning program 200 develops algorithms based on the patterns and trends found in users' communication content sources to determine an approximate lexicon reading level. All tokens are assigned a token difficulty rating as described in step 330 of FIG. 3. In an embodiment of the present invention, once a word is assigned a token difficulty rating, a lexicon reading level may be determined by taking the lexicon frequency index multiplied by the difficulty ratings of the tokens (a token difficulty index) all divided by the total number of tokens. Other formats for determining reading levels for users utilizing the lexicon frequency index may be implemented in other embodiments. Lexicon reading levels linked to lexicon profiles may be stored on database 114 of FIG. 1.

Figure 3:
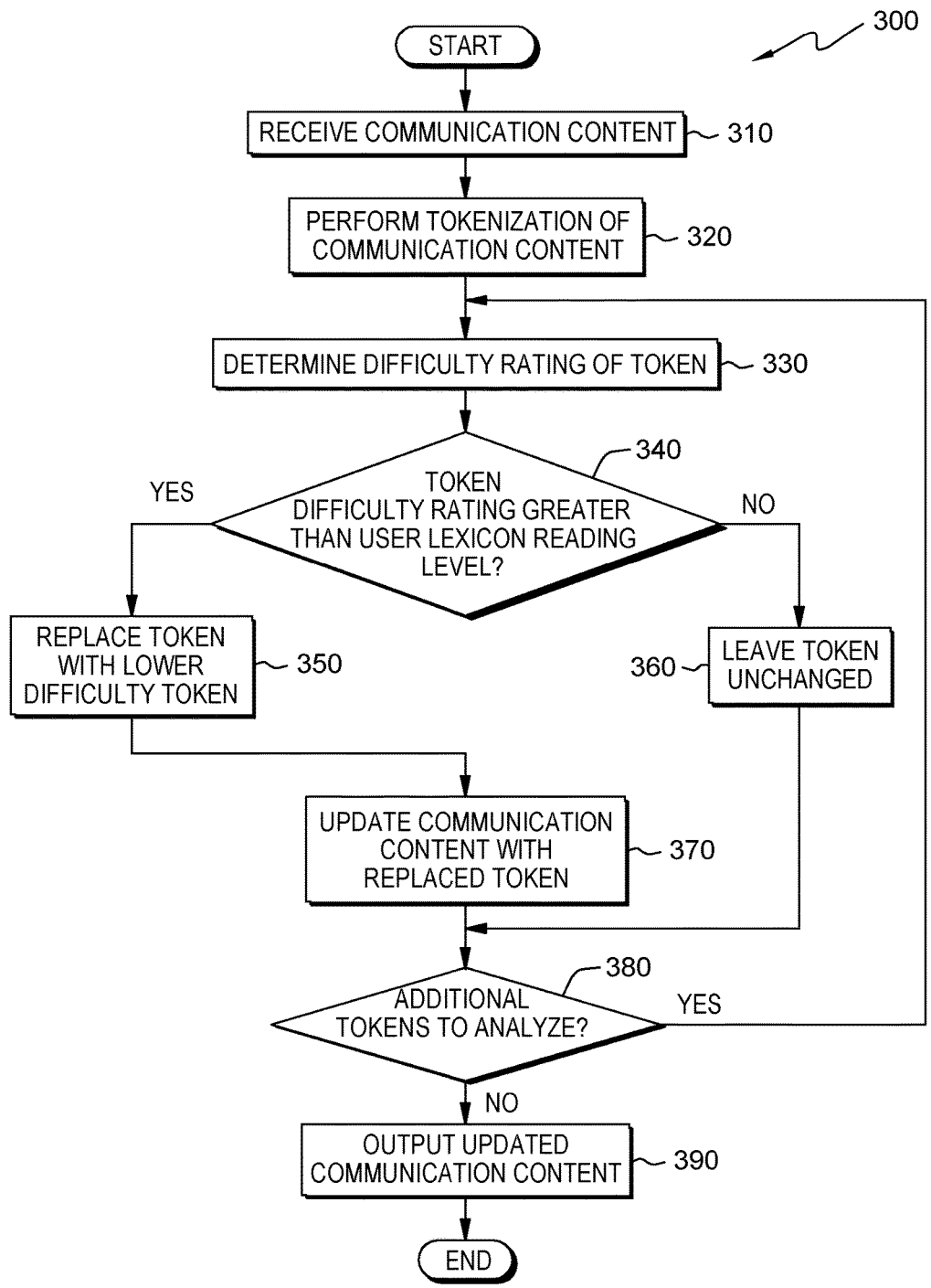
FIG. 3 illustrates operational steps of a text replacement program, on the computer server, within the distributed data processing environment of FIG. 1, in accordance with an embodiment of the present invention.

FIG. 3 illustrates operational steps of text replacement program 300, on computer server 108, within distributed data processing environment 100 of FIG. 1, for predictively, replacing tokens in communication content with tokens that have a difficulty rating within a user's lexicon reading level, in accordance with an embodiment of the present invention.

Text replacement program 300 receives communication content that is not previously consumed by the user (step 310). Unconsumed communication content may be any media that can be translated into text and utilized in text replacement, and for simplicity is referred to as a document. A document containing written text is uploaded to be processed by text replacement program 300. Users of user interface 106 of FIG. 1 may upload a document, provide a link to a document, or run text replacement program 300 as an applet in a web-browser that constantly analyzes new pages as they are loaded. The document contains text that the user intends to read and not a document that the user has written. In some embodiments of the present invention, the user has created a lexicon profile. In other embodiments, the user has linked communication content sources to the lexicon profile and has a lexicon reading level determined by lexicon learning program 200, in connection to the lexicon profile. For example, a user has created a lexicon profile and has a determined lexicon reading level. The user inputs a work-related document containing highly technical content that the user is not familiar with. The user does not understand particular words in the work-related document and would prefer to replace the unfamiliar content with words the user can understand. In yet other embodiments, text replacement program 300 utilizes speech-to-text recognition software to transform audio communication into a computer-readable format. For example, text replacement program 300 receives an audio recording of an oral presentation. Text replacement program 300 utilizes speech-to-text software to transform the audio recording into a computer-readable format in order to utilize it as an uploaded communication content.

Text replacement program 300 uses natural language processing tokenization of the document received (step 320). Text replacement program 300 receives the series of characters (alpha characters, numeric characters and punctuation marks or emoticons) that make up the content of the document and generates tokens from the text. Tokenization is processed, as described in step 230 of FIG. 2, to break-up a stream of text into words, phrases, symbols, or other meaningful elements. Tokenization takes into consideration punctuation, spaces, contractions, hyphens, and emoticons. For example, the text phrase "brevity is the soul of wit" would likely generate the following tokens: "brevity", "is", "the", "soul", "of", and "wit". In an embodiment of the present invention, text replacement program 300 accesses a source of words, such as a computer readable dictionary, or simply a word list, to determine tokens within communication content sources. A source of words, such as computer readable dictionaries or word lists, may be stored on database 114 of FIG. 1.

After tokenizing the entire document, text replacement program 300 determines a difficulty rating for a token (step 330) utilizing natural language processing. Each token is assigned a specific token difficulty rating. A token difficulty rating for a token reflects how likely a language speaker would know the token. In some embodiments of the present invention, a difficulty rating is a number signifying the reading level required to understand the token. In other embodiments, the difficulty rating can be indicated with a term, a character or a symbol. In yet other embodiments, a higher difficulty rating indicates the word or term is more advanced, and more difficult to understand. In still other embodiments, different progressions of token difficulty ratings are utilized. Token-difficulty rating assignments may be stored on database 114 of FIG. 1.

In an embodiment of the present invention, text replacement program 300 utilizes natural language processing to determine a difficulty rating of sentence structures. Each sentence is paired with a specific difficulty rating based on sentence structure aspects such as word contexts and uses of complicated linguistic phrases such as double negatives, eggcoms, portmanteaus, and colloquialisms. This embodiment is reflected in the following steps of text replacement program 300 where difficulty ratings of sentence structures are used in comparison with a user's lexicon reading level.

Upon determining the difficulty rating of the token, text replacement program 300 determines whether the token difficulty rating is greater than the user's lexicon reading level (decision step 340). The user's lexicon reading level may be retrieved from database 114 of FIG. 1. Token difficulty ratings and lexicon reading levels are of the same magnitude and can be compared to each other. For the case in which text replacement program 300 determines that the token difficulty rating is greater than the user's lexicon reading level and the token does not appear in the user's lexicon frequency index, (step 340, "YES" branch), text replacement program 300 proceeds to replace the token with a lower difficulty rated token (step 350). In this case, the lower difficulty rated token is of equal or lesser value than the user's lexicon reading level and is a like-meaning synonym of the original token. For example, a token "ameliorate" may be replaced with the token "improve." In this example, the token "ameliorate" has a higher token difficulty rating than a user's lexicon reading level. Text replacement program 300 replaces the token "ameliorate" with a lower difficulty rated token "improve." In an embodiment of the present invention, like-meaning synonyms that appear in the user's lexicon frequency index may be favored as replacement tokens over a like synonym token that does not appear in the list. In another embodiment, like-meaning synonyms that do not appear in the user's lexicon frequency index may be favored as replacement tokens.

In other embodiments of the present invention, text replacement program 300 proceeds to replace the token with the definition of the token. For example, a token "ameliorate" may be replaced with the definition phrase "to make or become better, more bearable, or more satisfactory." In this example, the token "ameliorate" has a higher token difficulty rating than a user's lexicon reading level. Text replacement program 300 replaces the token "ameliorate" with its lower difficulty rated dictionary definition. The token's dictionary definition is retrieved from database 114 of FIG. 1.

For the case in which text replacement program 300 determines that the token difficulty rating is not greater than the user's lexicon reading level, (step 340, "NO" branch), text replacement program 300 proceeds to leave the token unchanged (step 360). In this case, the token is less than or equal to the user's lexicon reading level and is unaffected by text replacement program 300.

After replacing the token with a lower difficulty rated token (step 350 text replacement program 300 proceeds to update the original document (step 370). If one or more tokens are replaced with a lower difficulty rated token, the document is modified to replace the original token with the lower difficulty rated token, for each token determined to be replaced. In an embodiment of the present invention, text replacement program 300 changes the font of the replaced token to highlight a replaced token for the user. In another embodiment, text replacement program 300 italicizes the replaced token. In yet another embodiment, text replacement program 300 changes the text color of the replaced token. If a token of the document is not replaced, the modified document includes the original token.

After regenerating and updating the document (step 370) or leaving the token unchanged (step 360), text replacement program 300 determines if there are additional tokens to analyze (decision step 380). For the case in which text replacement program 300 determines that there are additional tokens' difficulty ratings that are present in the document that have not been compared to the user's lexicon reading level, (step 380, "YES" branch), text replacement program 300 returns to step 330 to determine the difficulty rating of the next token. For example, text replacement program 300 replaces the first token of a document with a lower difficulty rated token. Text replacement program 300 updates the document with the replaced token. Text replacement program 300 determines that there are additional tokens present in the document that have not been compared with the user's lexicon reading level. Therefore, text replacement program 300 proceeds to the second token and determines the difficulty rating of the second token.

For the case in which text replacement program 300 determines all tokens present in the document have been compared to the user's lexicon reading level, (step 380, "NO" branch), text replacement program 300 proceeds to output the updated document (step 390). The outputted updated document may contain tokens modified by text replacement program 300 to have a difficulty rating equal to or lower than the user's lexicon reading level.

In an embodiment of the present invention, the user may hover over the replaced text of the outputted updated document of text replacement program 300 and view the original replaced tokens using user interface 106 of FIG. 1. For example, the token "ameliorate" is replaced with the token "improve" by text replacement program 300 in a document. Text replacement program 300 outputs the document. The user may hover over the text reading "improve" and the document would display the original replaced token "ameliorate" in the place of the text reading "improve."

In another embodiment of the present invention, text replacement program 300 replaces a lower difficulty token with a higher difficulty rated token for education use to promote reading skills and introduce new vocabulary to a user. Upon determining the difficulty rating of the token, text replacement program 300 determines whether the token difficulty rating is less than the user's lexicon reading level. For the case in which text replacement program 300 determines that the token difficulty rating is less than the user's lexicon reading level, text replacement program 300 proceeds to replace the token with a higher difficulty rated token. In this case, the higher difficulty rated token is of equal or greater value than the user's lexicon reading level and is a like-meaning synonym of the original token. For example, a token "improve" may be replaced with the token "ameliorate." In this example, the token "improve" has a lower token difficulty rating than a user's lexicon reading level. Text replacement program 300 replaces the token "improve" with the higher difficulty rated synonym "ameliorate." For the case in which text replacement program 300 determines that the token difficulty rating is not lower than the user's lexicon reading level, text replacement program 300 proceeds to leave the token unchanged. In this case, the token is greater than or equal to the user's lexicon reading level and is unaffected by text replacement program 300. Embodiments of the present invention in which text replacement program 300 replaces tokens of a document in a "reverse mode", for educational purposes, replace tokens of a document with higher difficulty tokens. In an embodiment, text replacement program 300 determines a limit on how many tokens get replaced in a document so that a user would not be overwhelmed by the number of new replaced words. The user may modify this limit of text replacement program 300.

In yet another embodiment of the present invention, text replacement program 300 may recommend a user, who has a lexicon reading level greater than or equal to a particular document's difficulty rating, to provide assistance to a user attempting to read the particular document. Natural language processing can obtain a difficulty rating for an entire document. Upon determining the difficulty rating of a document, text replacement program 300 determines whether the document's difficulty rating is less than or equal to a user's lexicon reading level. If the document's difficulty rating is less than or equal to the user's lexicon reading level, text replacement program 300 makes no recommendation. If the document's difficulty rating is greater than a first user's lexicon reading level, text replacement program 300 may recommend to the first user, a second user who has a lexicon reading level greater than or equal to a document's difficulty rating. For example, user A wants to read and understand a document. User A's lexicon reading level is below the document's difficulty rating and user B's lexicon reading level is above the document's difficulty rating. Text replacement program 300 recommends user B to user A to assist in reading and understanding the document. User B may be a "friend" or "follower" of user A in one of user A's linked social media accounts. Text replacement program 300 proceeds with text replacement as described above. In still another embodiment, text replacement program 300 may recommend a user, who has a large number of matching tokens in their lexicon frequency index that overlap a particular document's tokens, to provide assistance to a user attempting to read the particular document. For example, user A wants to read and understand a document and user A's lexicon reading level is below the document's difficulty rating. User B's lexicon frequency index contains many of the same tokens as the tokens in the document. Text replacement program 300 recommends user B to user A to assist in reading and understanding the document.

Figure 4:
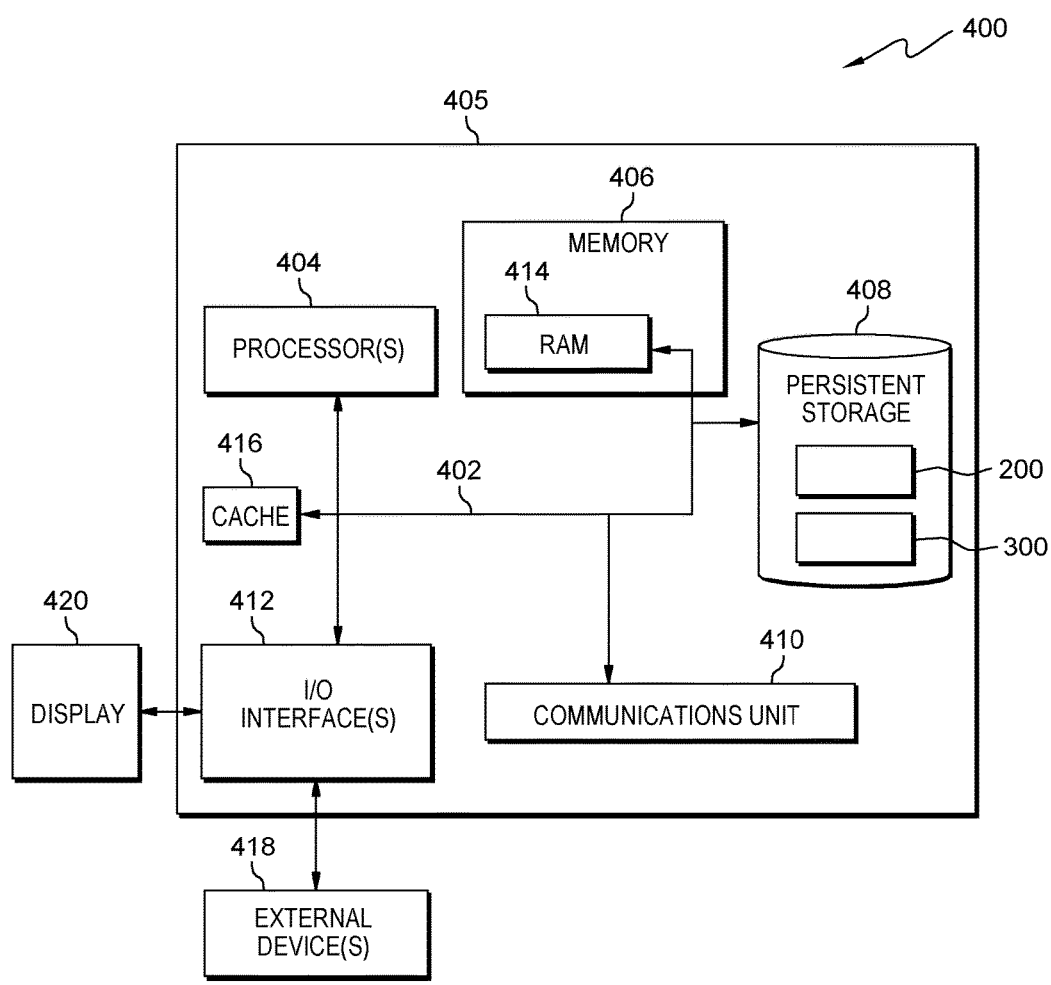
FIG. 4 depicts a block diagram of components of a computing system, which includes a computing device capable of operating the lexicon learning program of FIG. 2 and the text replacement program of FIG. 3, in accordance with an embodiment of the present invention.

FIG. 4 depicts a block diagram of components of computing system 400, which includes computing device 405, which is capable of operating lexicon learning program 200 of FIG. 2 and text replacement program 300 of FIG. 3, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 405, includes components and functional capability similar to computer server 108 and user device 104, in accordance with an illustrative embodiment of the present invention. Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In some embodiments of the present invention, lexicon learning program 200 and text replacement program 300 are stored in persistent storage 408 for execution by one or more of the respective computer processors 404 via one or more memories of memory 406. In these embodiments, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100, user device 104, and computer server 108. In these examples, communications unit 410 includes one or more network interface cards. Communications unit 410 may provide communications through the use of either or both physical and wireless communications links. Lexicon learning program 200 and text replacement program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., lexicon learning program 200 and text replacement program 300 can be stored on such portable computer readable storage media and can be loaded onto persistent storage 408 via. I/O interface(s) 412 I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining a lexicon reading level of a user, the computer-implemented method comprising:
   receiving a set of email messages, each email message being previously written by the user;
   generating tokens corresponding to words in the set of email messages, the tokens being identified in a word list, the word list associating words with respectively corresponding difficulty ratings;
   generating a token frequency index assigned to the user, based on the tokens generated from the set of email messages;
   determining the lexicon reading level of the user based on the token frequency index and a source of difficulty ratings of the tokens according to the word list;
   adding the lexicon reading level of the user to a lexicon profile;
   identifying, by an applet, a web page loaded by a web-browser;
   retrieving, from the lexicon profile, the lexicon reading level of the user;
   performing a tokenization of the web page;
   generating a plurality of tokens, based on the tokenization;
   determining a difficulty rating of a first token of the plurality of tokens;
   determining whether the difficulty rating of the first token differs from the lexicon reading level of the user;
   responsive to determining the difficulty rating of the first token exceeds the lexicon reading level of the user, replacing the first token with a replacement token;
   modifying the web page to include the replacement token for the first token; and
   displaying to the user the modified web page;
   wherein:
   the lexicon reading level of the user indicates a reading level of the user; and
   the replacement token includes a synonym of the first token that is consistent with the lexicon reading level of the user according to the word list.

2. The computer-implemented method of claim 1 further comprising:
   determining a second difficulty rating of a second token of the plurality of tokens;
   responsive to determining the second difficulty rating of the second token does not exceed the lexicon reading level of the user, replacing the second token with an advanced token;
   wherein:
   the advanced token includes a synonym of the second token, the synonym having an assigned difficulty rating that is higher than the lexicon reading level of the user according to the word list.

3. A computer program product determining a lexicon reading level of a user, the computer program product comprising:
   one or more computer-readable storage media, and program instructions stored on the one or more computer-readable storage media, executable by one or more processors, the stored program instructions comprising:
   program instructions to receive a set of email messages, each email message being previously written by the user;
   program instructions to generate tokens corresponding to words in the set of email messages, the tokens being identified in a word list, the word list associating words with respectively corresponding difficulty ratings;
   program instructions to generate a token frequency index assigned to the user, based on the tokens generated from the set of email messages;
   program instructions to determine the lexicon reading level of the user based on the token frequency index and a source of difficulty ratings of the tokens according to the word list;
   program instructions to add the lexicon reading level to a lexicon profile of the user;
   program instructions to identify, by an applet, a web page loaded by a web-browser;
   program instructions to retrieve, from the lexicon profile, the lexicon reading level;

program instructions to perform a tokenization of the web page;

program instructions to generate a plurality of tokens, based on the tokenization;

program instructions to determine a difficulty rating of a first token of the plurality of tokens;

program instructions to determine whether the difficulty rating differs from the lexicon reading level;

program instructions to, responsive to determining the difficulty rating of the first token exceeds the lexicon reading level, replace the first token with a replacement token;

program instructions to modify the web page to include the replacement token for the first token; and program instructions to display to the user the modified web page;

wherein:

the lexicon reading level indicates a reading level of the user; and the replacement token includes a synonym of the first token that is consistent with the lexicon reading level according to the word list.

4. The computer program product of claim 3, the stored program instructions further comprising:

program instructions to determine a second difficulty rating of a second token of the plurality of tokens;

program instructions to, responsive to determining the second difficulty rating of the second token does not exceed the lexicon reading level of the user, replacing the second token with an advanced token;

wherein:

the advanced token includes a synonym of the second token, the synonym having an assigned difficulty rating that is higher than the lexicon reading level of the user according to the word list.

5. A computer system determining a lexicon reading level of a user, the computer system comprising:

one or more computer processors;

one or more computer readable storage device;

program instructions stored on the one or more computer readable storage devices for execution by at least one of the one or more computer processors, the stored program instructions comprising:

program instructions to receive a set of email messages, each email message being previously written by the user;

program instructions to generate tokens corresponding to words in the set of email messages, the tokens being identified in a word list, the word list associating words with respectively corresponding difficulty ratings;

program instructions to generate a token frequency index assigned to the user, based on the tokens generated from the set of email messages;

program instructions to determine the lexicon reading level of the user based on the token frequency index and a source of difficulty ratings of the tokens according to the word list;

program instructions to add the lexicon reading level to a lexicon profile of the user;

program instructions to identify, by an applet, a web page loaded by a web-browser;

program instructions to retrieve, from the lexicon profile, the lexicon reading level;

program instructions to perform a tokenization of the web page;

program instructions to generate a plurality of tokens, based on the tokenization;

program instructions to determine a difficulty rating of a first token of the plurality of tokens;

program instructions to determine whether the difficulty rating differs from the lexicon reading level of the user;

program instructions to, responsive to determining the difficulty rating of the first token exceeds the lexicon reading level, replace the first token with a replacement token;

program instructions to modify the web page to include the replacement token for the first token; and program instructions to display to the user the modified web page;

wherein:

the lexicon reading level indicates a reading level of the user; and the replacement token includes a synonym of the first token that is consistent with the lexicon reading level.

6. The computer system of claim 5, the stored program instructions further comprising:

program instructions to determine a second difficulty rating of a second token of the plurality of tokens;

program instructions to, responsive to determining the second difficulty rating of the second token does not exceed the lexicon reading level of the user, replace the second token with an advanced token;

wherein:

the advanced token includes a synonym of the second token, the synonym having an assigned difficulty rating that is higher than the lexicon reading level of the user according to the word list.

* * * * *